(12) United States Patent
Munsters (10) Patent No.: US 10,406,895 B2
(45) Date of Patent: Sep. 10, 2019

(54) WINDING MECHANISM FOR A SUNSCREEN

(71) Applicant: Inalfa Roof Systems Group B.V., Oostrum (NL)

(72) Inventor: Paulus Johannes Wilhelmus Munsters, Uden (NL)

(73) Assignee: Inalfa Roof Systems Group B.V., Oostrum (NL)

( * ) Notice: Subject to any disclaimer, the term of this patent is extended or adjusted under 35 U.S.C. 154(b) by 0 days.

(21) Appl. No.: 15/829,458

(22) Filed: Dec. 1, 2017

(65) Prior Publication Data
US 2018/0162683 A1  Jun. 14, 2018

(30) Foreign Application Priority Data
Dec. 8, 2016 (EP) .................... 16202969

(51) Int. Cl.
*B60J 3/00* (2006.01)
*B60J 7/00* (2006.01)
*B60J 1/20* (2006.01)

(52) U.S. Cl.
CPC ........... *B60J 7/0015* (2013.01); *B60J 1/2033* (2013.01); *B60Y 2306/09* (2013.01); *B65H 2701/175* (2013.01)

(58) Field of Classification Search
CPC ...... B60J 7/0015; B60J 1/2013; B60J 1/2033; B60J 1/205
USPC ................ 296/214; 160/245, 254, 313, 318; 267/155, 166–180
See application file for complete search history.

(56) References Cited

U.S. PATENT DOCUMENTS 3,763,916 A  10/1973 Gossling
4,540,070 A * 9/1985 Yonovich ............ E05D 13/1207
                                                   16/197

(Continued)

FOREIGN PATENT DOCUMENTS

DE           20011452 U1   10/2001
DE      202005007135 U1    9/2005
(Continued)

OTHER PUBLICATIONS

Communication from European Patent Office for European Patent Application No. 16202969.8, dated Apr. 16, 2019.

*Primary Examiner* — Dennis H Pedder
(74) *Attorney, Agent, or Firm* — Steven M. Koehler; Westman, Champlin & Koehler, P.A.

(57) ABSTRACT

A winding mechanism for a sunscreen, for use in an open roof construction for a vehicle, includes a winding shaft which is supported at each longitudinal end to a stationary part of the open roof construction and forming a central axis for rotation. A winding tube for the sunscreen is rotatable around the central axis. At least one spring member is configured to bias the winding tube in a direction for winding the sunscreen thereon. The spring member is arranged adjacent to an inner surface of the winding tube and an outer surface of the winding shaft. At least one sleeve is configured to engage the spring member and inhibit noise from the spring member. The sleeve comprises an inner surface and an outer surface, wherein the at least one sleeve is connected along its inner surface to the winding shaft or along its outer surface to the winding tube.

19 Claims, 9 Drawing Sheets

(56) References Cited

U.S. PATENT DOCUMENTS

| | | | |
|---|---|---|---|
| 4,854,558 A * | 8/1989 | Newton | E05D 13/1253 |
| | | | 267/74 |
| 5,543,194 A | 8/1996 | Rudy | |
| 5,713,412 A * | 2/1998 | Wepfer | F16L 55/04 |
| | | | 138/30 |
| 5,908,673 A | 6/1999 | Muhlberger | |
| 6,148,562 A * | 11/2000 | Stark | E05D 13/08 |
| | | | 49/429 |
| 7,243,699 B2 | 7/2007 | Ganser et al. | |
| 8,210,230 B2 | 7/2012 | Glasl | |
| 8,256,492 B2 | 9/2012 | Lin | |
| 9,067,480 B2 | 6/2015 | Wulms | |
| 2006/0000566 A1 | 1/2006 | Ganser et al. | |
| 2008/0073039 A1 | 3/2008 | Gyngell et al. | |
| 2014/0014757 A1 | 1/2014 | Wulms | |

FOREIGN PATENT DOCUMENTS

| | | |
|---|---|---|
| DE | 202005016889 U1 | 1/2006 |
| DE | 102004030262 B3 | 4/2006 |
| DE | 202012008487 U1 | 9/2012 |
| EP | 2529965 A1 | 12/2012 |
| EP | 2610093 A2 | 7/2013 |
| JP | 2012057364 A | 3/2012 |

\* cited by examiner

WINDING MECHANISM FOR A SUNSCREEN

BACKGROUND

The discussion below is merely provided for general background information and is not intended to be used as an aid in determining the scope of the claimed subject matter.

Aspects of the invention relate to a winding mechanism for a sunscreen, for use in an open roof construction for a vehicle.

In prior art sunscreens having a winding mechanism (also known as rollo sunscreens) the spring member, mostly a metal helical torsion spring, is covered by a sleeve preventing the spring member from touching the winding tube. Also it is possible that a winding shaft is mounted inside the hollow shape of the helical torsion spring and whereby a sleeve is used around the shaft to prevent the spring from touching the outer surface of the shaft such as been disclosed in EP 2 610 093. When no sleeves are used the spring member will rattle or scrape against the inner surface of the winding tube or the outer surface of the winding shaft resulting in an unpleasant noise for the passengers of the vehicle. Such noises can occur when the winding mechanism is operated but also when the vehicle makes certain dynamic movements. Due to the torque applied between the spring member ends and the rotational movement of a part of the spring and also due to the dynamic movements applied to the winding mechanisms the spring temporarily engages with the sleeves. These engagements are often accompanied by impacts and forces which the spring member applies to the sleeves. This causes the sleeve to be moved from its original position exposing a part of the winding tube or winding shaft which may cause rattle. Sleeves may be secured in their proper position with the help of a tape, however these connections often are not reliable during the lifetime of the winding mechanism.

Furthermore the problem occurs with the prior art sleeves that when the helical spring member is tensioned (wound) and, due to this, has a decreased diameter, and at the same time the shape of the spring member has a tendency to be deformed from a more or less straight cylindrical shape into a helical shape extending along its length, whereby thus the spring member may engage the sleeves. Such engagements may cause a rotational movement of a local part of the sleeves, especially when the sleeves are not firmly fixed to the spring member or the winding shaft. These rotational movements of part of the sleeves induce that the sleeves wrinkle and obstruct the spring member in its function. For instance the spring member may cause higher roll out forces of the sunscreen or the winding mechanism is not capable to wind the sunscreen onto the winding tube.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they in-tended to be used as an aid in determining the scope of the claimed subject matter. The claimed subject matter is not limited to implementations that solve any or all disadvantages noted in the Back-ground.

A winding mechanism for a sunscreen, for use in an open roof construction for a vehicle includes a winding shaft which is supported at each longitudinal end to a stationary part of the open roof construction, and forming a central axis for rotation. A winding tube is provided for winding and unwinding the sunscreen, being rotatable around the central axis. At least one spring member is configured to bias the winding tube in a direction for winding the sunscreen thereon, said spring member is arranged adjacent to an inner surface of the winding tube and an outer surface of the winding shaft. At least one sleeve is configured to engage the spring member and inhibit noise from the spring member, wherein the sleeve comprises an inner surface and an outer surface. The at least one sleeve is connected along its inner surface to the winding shaft or along its outer surface to the winding tube.

When the at least one sleeve has a permanent connection to the winding shaft or the winding tube such that said sleeve, which is flexible, will not shift in any lateral or radial direction relative to said spring member under influence of engagement forces of the spring member, it is prevented that the spring member can engage any uncovered part of the winding shaft or winding tube.

According to another aspect of the invention, the at least one sleeve has a cylindrical shape and is circularly knitted or braided in a cylindrical manner. In this way the sleeve does not have a welding edge or a seam along its length which may form a hard edge and which may compromise the function of the sleeve or the handling when manufacturing the sleeve. For instance a hard edge or a seam may cause the sleeve to be thicker locally along its length, whereby the sleeve may compromise the biasing function of the spring member, e.g. by increasing the forces to roll out/unwind the sunscreen or cause the sunscreen not to wind up completely. The sleeve is made of yarns of the material class comprising Polyolefins, Polyesters or Polyamides and whereby the sleeve has a circular shape. As such these materials must be able to withstand temperatures up to at least 200° C. before these yarns melt.

The manufacturing methods and the type of yarns used create a sleeve which has a special property, that when a caulking force is applied to the sleeve whereby said force is applied in a longitudinal direction of said sleeve, and is applied in the vicinity of both longitudinal ends of the sleeve whereby said forces are directed towards each other (caulking force) the sleeve is increased in diameter. This increase in diameter is beneficial for mounting the at least one sleeve to one or both of the winding shaft and the winding tube. In case of mounting to the winding shaft, the sleeve can be easily mounted around the winding shaft due to the enlarged diameter.

After mounting the sleeve, releasing the caulking force on the sleeve results in that the sleeve decreases its diameter and resumes its normal diameter which fits tightly around the winding shaft. In this way the sleeve can be easily mounted and connected to the winding shaft as is explained later in detail in this document.

Similarly in case the inside of the winding tube needs to be equipped with a sleeve, the same property of an increasing diameter when the sleeve is subjected to a similar application of a caulking force can be used to get the sleeve's outer surface in contact with the inner surface of the winding shaft. However in this case the connection of the sleeve to the tube must be done before taking away the caulking force off the sleeve. This process is described below.

Also it is feasible, instead of applying a caulking load on the sleeve, to apply a tensile force near the ends of the sleeve whereby the forces are directed in longitudinal direction of the sleeve and are pointed in a direction away from each other (tensile force). This has the effect on the sleeve that the diameter of the sleeves reduces. With these phenomena it is possible to use a sleeve diameter that is bigger than the diameter of the winding shaft, such that the sleeve can be easily assembled to the winding shaft, by sliding the winding shaft into the circular shaped sleeve. Further, a tensile force can be applied on the sleeve which decreases its inner diameter to be equal to the outer diameter of the winding shaft. After the sleeve is permanently connected to the outer surface of the winding shaft this tensile force can be removed from the sleeve.

According to another aspect of the invention, the sleeve additionally comprises yarns of a material that melts at temperatures in the range of 140-200° C. or more preferred in the range of 150-160° C., and wherein the sleeve is connected on many individual points along its inner or outer surface to one or both of the winding shaft and the winding tube by melted sleeve material under the influence of heat. In this case for the additional yarns for example materials from the class of Polyurethane can be used, however materials from other classes may be used as well, provided that the melting temperature falls into the above mentioned range of 140-200° C. The additional yarns are circularly knitted or braided in such a way that these yarns are exposed to the inner and outer surface of the sleeve. These yarns have also the property that the materials of which these yarns are made have a good adherence to metals upon melting of these yarns. As such the sleeve is connected on many individual points along the surface by melted sleeve material to one or both of the winding shaft and the winding tube under the influence of heat.

The sleeve may have alternatively additional yarns coated or soaked with a hot melt or wherein the inner or outer surface of the sleeve is integrally coated with hot melt. Such hot melt material basically provides the same type of quality of adherence of the sleeves to the metal materials of the winding shaft or the winding tube as compared to the adherence by means of melted material.

According to another aspect of the invention the sleeve additionally comprises yarns, or intermingled fibers of a material having an additional noise inhibiting effect. Thus the sleeve may have extra noise dampening effect needed for instance when vehicle noise requirements are extremely high.

The winding mechanism according to the invention, for use in an open roof construction for a vehicle further comprises a sunscreen with an end secured to the winding tube, the sunscreen being configured to be wound upon and unwound from the winding tube.

An aspect of the invention also includes a sunshade assembly comprising the winding mechanism described above and an open roof construction comprising such sunscreen assembly.

According to another aspect of the invention, following is a description of a method for assembly of a winding mechanism for a sunscreen, for use in an open roof construction for a vehicle, the winding mechanism comprising the following parts:

a winding shaft which is supported at each longitudinal end to a stationary part of the open roof construction and forming a central axis for rotation, and a winding tube being rotatable around the central axis of rotation for winding and unwinding the sunscreen, at least one spring member configured to bias the winding tube in a direction for winding the sunscreen thereon, said spring member arranged adjacent to an inner surface of the winding tube and an outer surface of the winding shaft, and at least one sleeve configured to engage the spring member and inhibit noise from the spring member, wherein the sleeve comprises an inner surface and an outer surface, and wherein the at least one sleeve is connected along its inner surface to the winding shaft or along its outer surface to the winding tube.

The method comprises:

applying a caulking force (F) by means of a gripper tool to a first of the at least one sleeves whereby said force is applied at least in the vicinity of both longitudinal ends of the sleeve in longitudinal direction of said sleeve, whereby said forces are directed towards each other such that the diameter of the sleeve is increased, assembling the sleeve around the winding shaft, by moving the winding shaft through the increased diameter of the sleeve to such extent that the sleeve leaves on both ends of the winding shaft an equal part of the shaft uncovered, releasing the caulking force (F) of the sleeve, whereby the sleeve decreases its diameter and resumes its normal diameter which fits tightly around the winding shaft, and/or applying a second sleeve into the inside of the winding tube by moving said second sleeve into an opening of the winding tube and positioning said sleeve inside the tube such that both sleeve ends are in equal distance with regards to the respective ends of the winding tube, applying a caulking force (F) to the sleeve using a gripper tool, whereby said force is applied in the vicinity of both longitudinal ends of the sleeve in a longitudinal direction of said sleeve, whereby said forces are directed towards each other such that the sleeve is increased in diameter en engages the inner surface of the winding tube, applying heat of in the range of 140-200° C. to one or both of the winding shaft and the winding tube and the respective pre-assembled sleeves, to permanently connect the sleeve(s) to said winding shaft and/or winding tube, curing of said permanent connection between the respective sleeve(s) and the winding shaft and/or the winding tube by cooling the parts off to room temperature, releasing the caulking force (F) whereby the sleeve maintains its diameter, and assembly of the winding mechanism by mounting the winding shaft, possibly with the pre-assembled sleeve, inside the spring member and mounting the spring member with the winding shaft into the opening of the winding tube, possibly with the pre-assembled sleeve.

With such method it is no longer necessary to fix loose sleeves to the spring member or the winding shaft or tube which need to be fixed by tapes nor is it necessary to apply felt pads on individual spots to avoid rattling noise caused by the spring member towards either of the winding tube or winding shaft.

Further details and advantages of aspects of the invention follow from the description below with reference to the drawings showing an example of an open roof construction having a sunscreen including a winding mechanism.

BRIEF DESCRIPTION OF THE DRAWINGS

FIGS. 9.1-9.9 are schematic illustrations of process steps showing the assembly of the winding shaft, the sleeves, the spring and the winding tube.

DETAILED DESCRIPTION OF THE ILLUSTRATIVE EMBODIMENT

Figure 1:
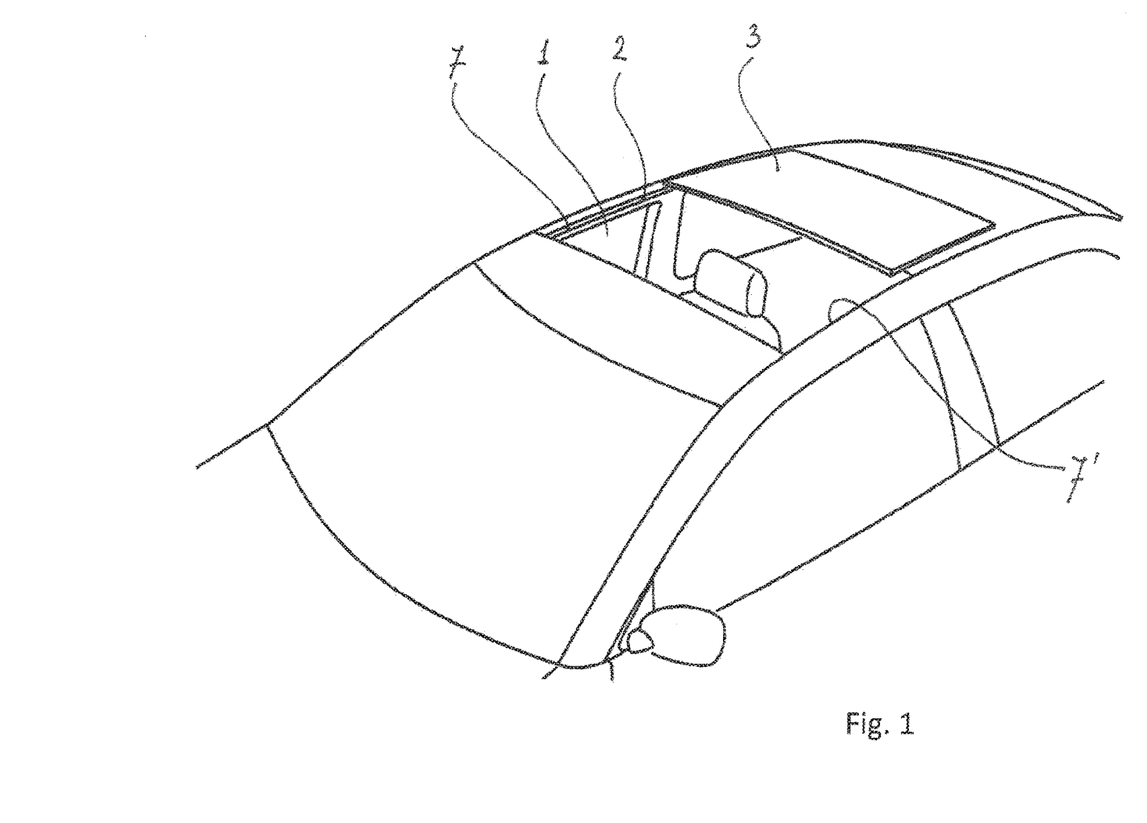
FIG. 1 is a schematic perspective view of a part of a vehicle having an open roof construction and a sunscreen.

Referring to FIG. 1, a part of a vehicle is illustrated the fixed roof of which is provided with an open roof construction. As illustrated, there is a roof opening 1 defined in a stationary part 2 of the open roof construction.

Figure 2:
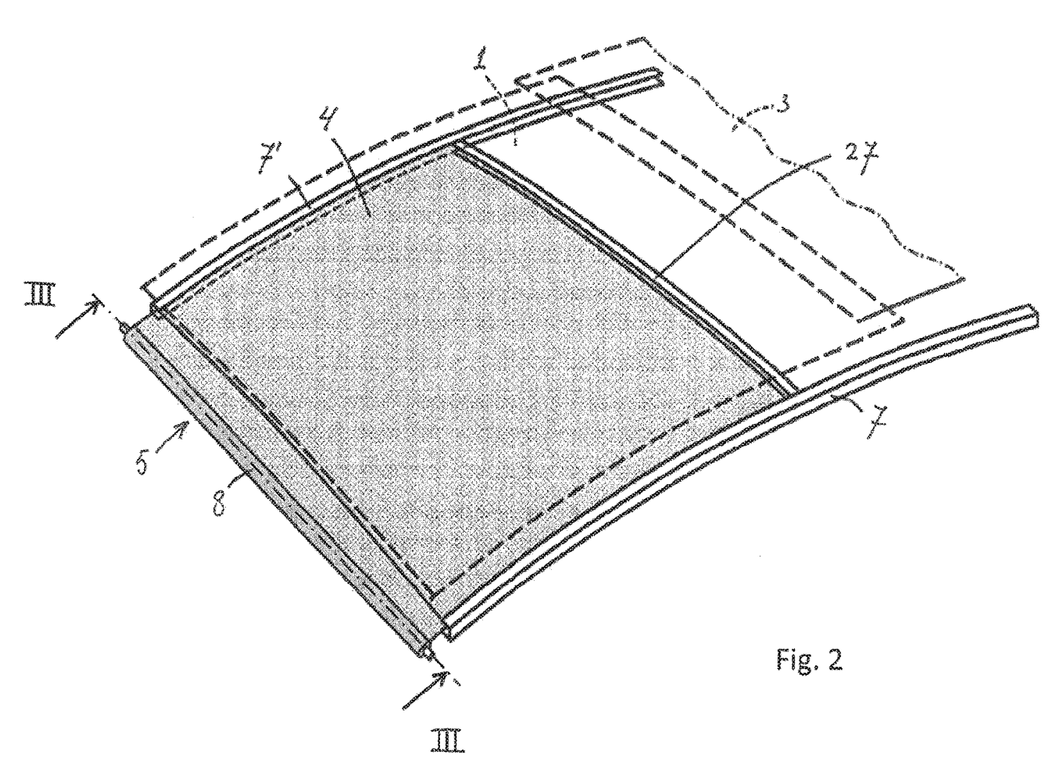
FIG. 2 is a perspective view of sunscreen.

At least one movable closure member, here an at least partially transparent, rigid panel 3, is provided for opening and closing said roof opening 1. FIG. 2 illustrates a sunscreen assembly cooperating with said roof opening 1 for covering the roof opening 1 from below to keep the sun partly or completely out of the vehicle department. The sunscreen assembly basically comprises a flexible sunscreen 4, a rotatable winding mechanism 5 for winding on or off the flexible sunscreen 4 and two elongate guide members 7, 7' for cooperation with the respective ones of longitudinal side edges of the sunscreen 4. A transversal edge of the sun screen 4 remote from the winding mechanism 5 is provided with an operating beam 27 in a manner known per se which may be moved along said guides 7, 7' for moving the sunscreen 4 while winding the latter on or off the winding mechanism 5. The operating beam 27 may be moved manually or by means of driving means such as a driving cable guided in driving channels and an electric driving motor known per se.

Figure 3:
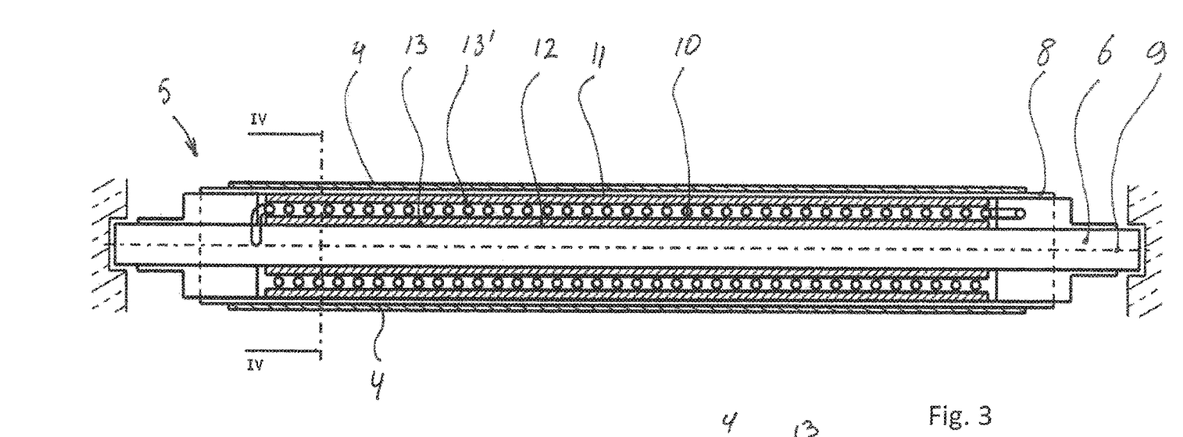
FIG. 3 is sectional view of a winding mechanism of FIG. 2
Figure 4:
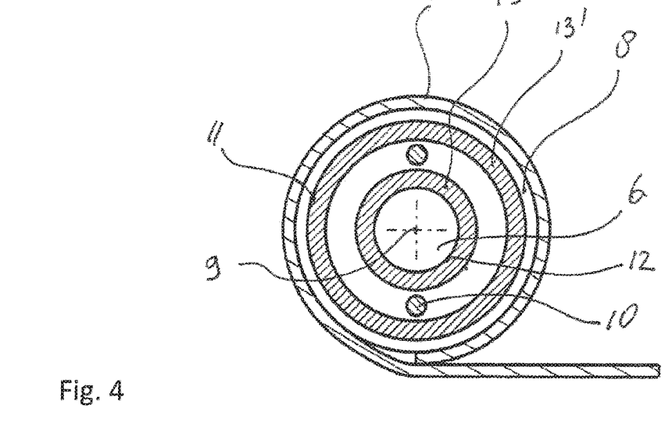
FIG. 4 is a sectional view of the winding mechanism of FIG. 3.

FIG. 3 and FIG. 4 show the winding mechanism 5 which is provided with a winding shaft 6 which forms the central part in axial direction, a winding tube 8 around which the flexible sunscreen 4 is wound (not shown) and a spring member 10 which is a biasing or tensioning device. The winding shaft 6 is supported at each longitudinal end towards the stationary part 2 of the open roof construction and forms a central axis 9 of rotation for the winding tube 8. The winding shaft 6 may be a metal part preferably of steel or aluminum but can also be of a plastic material. Spring member 10 may be a metal, in particular steel helical coil spring and is a biasing device, the axis of the spring member 10 coincides with the axis of rotation of the winding tube 8. The spring member 10 is connected to a bearing fixedly connected to the winding tube 8 by means of a first end of the spring member 10 and connected to the winding shaft 6 or the stationary part 2 at a second end of the spring member 10.

When the sunscreen 4 is unwound from the winding tube 8, the spring member 10 will be biased between the winding tube 8 and the winding shaft 6. This biasing force enables the spring member 10 to wind the sunscreen 4 onto the winding tube 8 when the sunscreen 4 needs to be rolled up onto the tube 8 again. The winding tube 8 is in this case a thin walled metal tube preferably made of steel or aluminum, however it can also be made of an extruded or molded plastic material. Due to packaging requirements the diameter of the winding tube 8 must be as small as possible. The shaft 6 and the spring member 10 are fitted inside the winding tube 8, such that the play between the inner surface of tube 10 and spring member 10, and from the inside of spring member 10 towards the shaft 6 is minimal. Without further protection in between these parts, these parts would rattle against each other under the influence of dynamic vehicle forces and use of the winding mechanism 5. Therefore, at least one sleeve 13, 13' or preferably two sleeves 13, 13' are fitted inside the mechanism assembly. A first sleeve 13 may be fitted around the outer surface of the winding shaft 6, whereas a second sleeve 13' may be fitted against the inner surface of the winding tube 8. As such the sleeves 13, 13' prevent the spring member 10 from engaging and rattling against the shaft 6 and/or the tube 10 under the influence of dynamic forces or the use of the winding mechanism 5.

The sleeves 13, 13' are connected along their respective inner surface 14 or outer surface 15 to the winding shaft 6 and winding tube 8. The connection between the sleeve 13, 13' and winding shaft 6 or winding tube 8 is permanent, such that the sleeve 13, 13' cannot shift in any lateral, circumferential or radial direction relative to said spring member 10 under influence of movements of the spring member 10. Especially in case the spring member 10 is wound up, by unwinding the sunscreen 4 from the winding shaft 6 the spring member 10 may be deformed in such a way that the typically cylindrical shape of the complete spring is deformed into a helical shape, whereby the outermost helical edge of the spring engages with the second sleeve 13' connected to the inner surface of the tube and the innermost helical edge of the spring member engages with the first sleeve 13 connected to the shaft, in such conditions the respective sleeves 13, 13' will not shift under the influence of these forces, nor by the dynamic forces caused by driving of the vehicle on an uneven road.

FIG. 4 shows also a sectional view of the cylindrical shape of the sleeves 13, 13' whereby the sleeves 13, 13' are circularly knitted or braided in a cylindrical manner, from yarns 16 made of the material class comprising Polyolefin, Polyester or Polyamide. The process of circular knitting or braiding enables the yarns 16 to slide with regard to each other. When a caulking force is applied to a sleeve whereby the force is applied in the vicinity of the longitudinal ends of the sleeve and whereby the forces are directed towards each other (which is normal when defining a caulking force), this caulking force influences the yarns such that the diameter of the circular knitted or braided cylindrical sleeves 13, 13' will increase or decrease depending whether the caulking force relative to the sleeves 13, 13' is directed towards each other (caulking force) or directed away from each other (tensile force).

Figure 5:
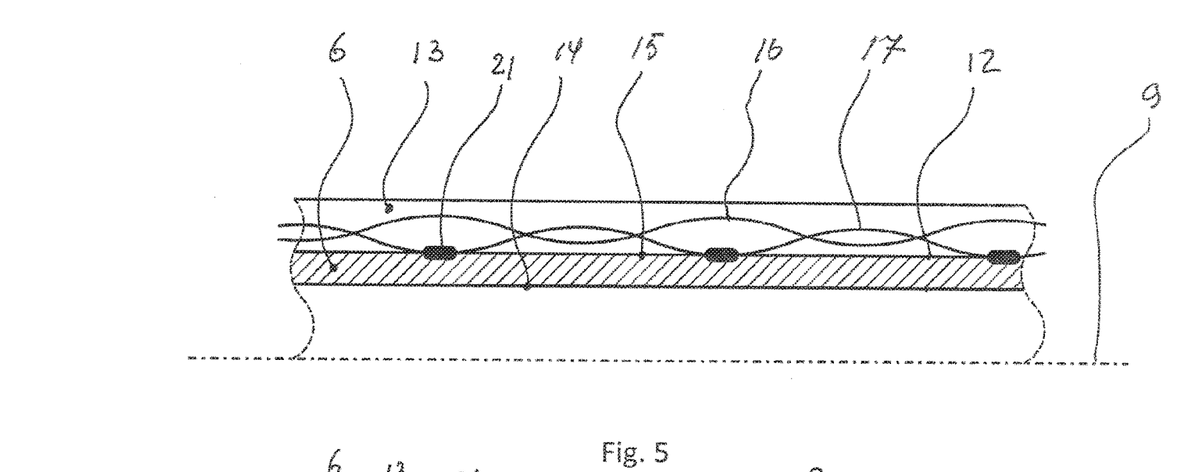
FIGS. 5-8 are schematic sectional views showing details of connection between the sleeve and the winding shaft.

FIGS. 5, 6, 7 and 8 show a schematic sectional view of a part of the winding shaft 6 and the at least one sleeve 13. These schematic views explain the connection between the sleeve 13 and the winding shaft 6 but the principles explained hereto are also valid for the sleeve 13' connected to the inner surface of the winding tube 8. In FIG. 5 an additional yarn 17 is shown next to the schematic indicated basic sleeve material of yarns 16 of which the sleeves 13, 13' are made. The additional yarn 17 is preferably made of a material that melts at temperatures in the range of 140-200° C., this can be for instance, but is not limited to Polyurethane. The yarns 17 are knitted or braided into the basic sleeve material of yarns 16 in such a way that these yarns 17 are exposed to the inner and outer surface 14, 15 of the sleeve 13, 13'. As such when the sleeve 13, 13' is engaged to either of the outer surface 12 of the winding shaft 6 and/or the inner surface 11 of the winding tube 8, yarns 17 are engaged with these respective surfaces. When heat is applied to the assembly of the winding shaft 6 and sleeve 13 and/or the winding tube 8 and the sleeve 13' these yarns 17 will melt and make a connection to the respective surfaces of the shaft and the tube forming the connection points 21.

Figure 6:
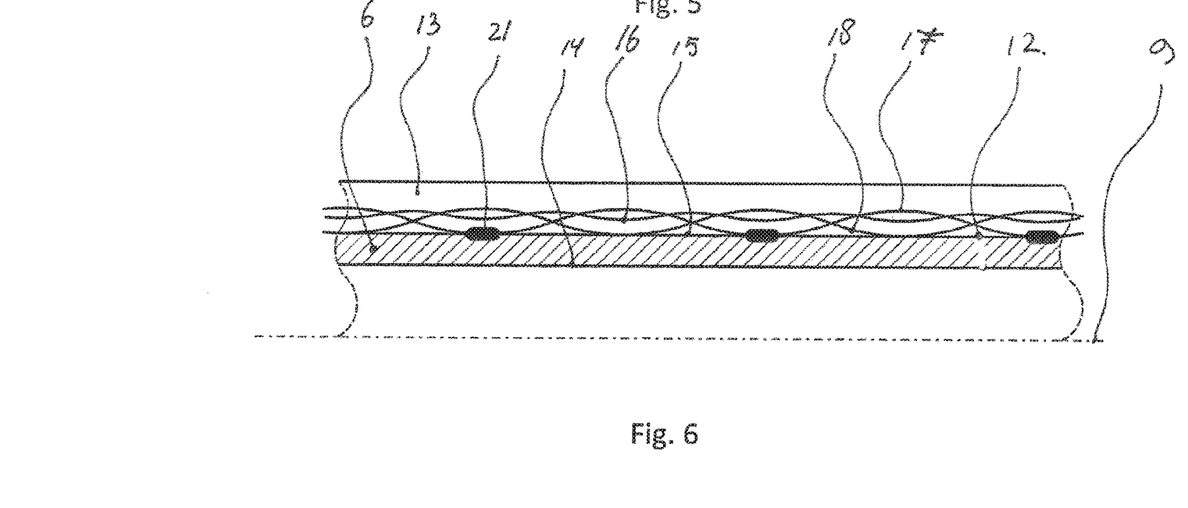
Figure 7:
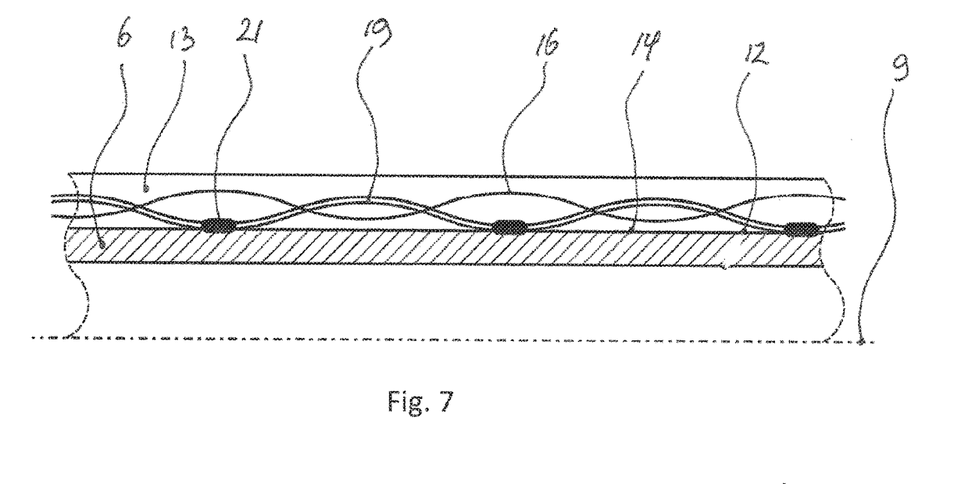
Figure 8:
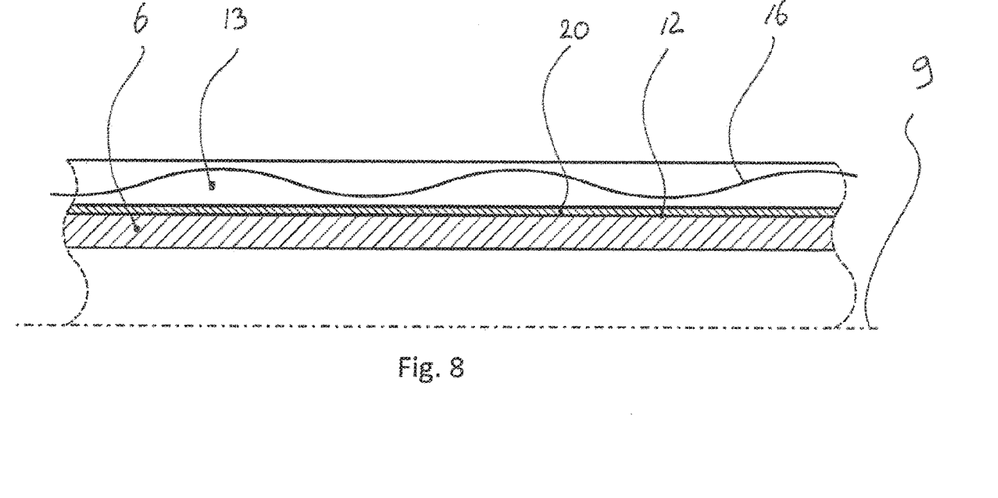
Figure 10:
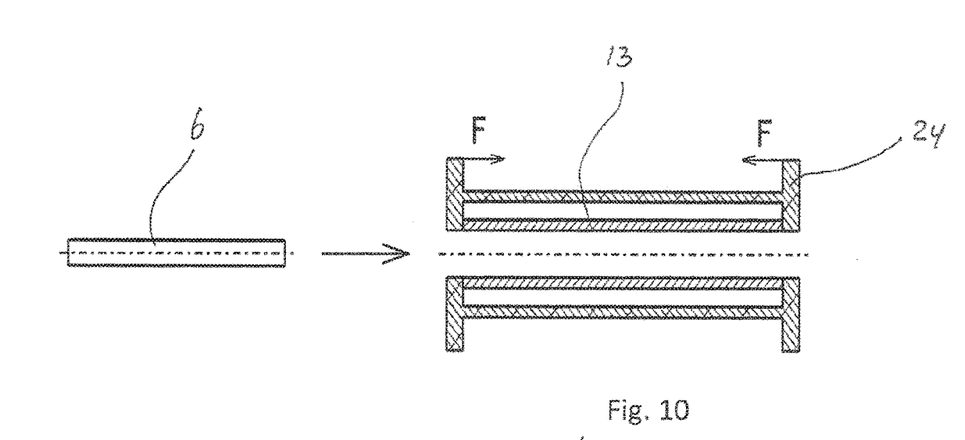
FIGS. 10 and 11 are schematic views of the tools used to mount the sleeves to the winding shaft and tube.
Figure 11:
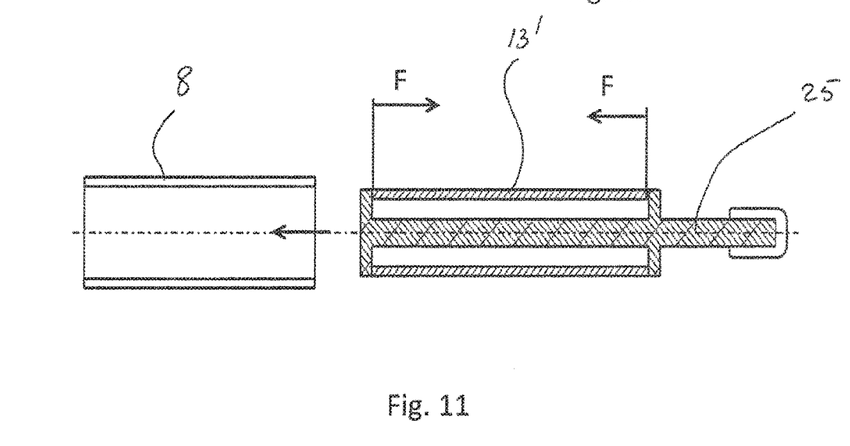

In FIG. 6 the basic material yarns 16 are shown and the additional yarns 17 with connection points 21. In these FIG. 6 also additionally yarns or intermingled fibers 18 of a material having an additional noise inhibiting effect are shown, which are knitted or braided with the basic material yarns 16 and the additional yarns 17. It is observed that these yarns 18 are exposed to the inner or outer surface 14, 15 of the sleeve 13, 13'. In FIG. 7 the basic material yarns 16 and additionally yarns 19 coated or soaked with a hot melt are shown or in FIG. 8 wherein the inner or outer surface 14, 15 of the sleeve 13, 13' is integrally coated with hot melt 20 is shown.

In FIG. 9.1 to FIG. 9.9 a schematic illustration of process steps showing the assembly of the winding shaft 6, the sleeves 13, 13', the spring and the winding tube 8.

Figure 91:
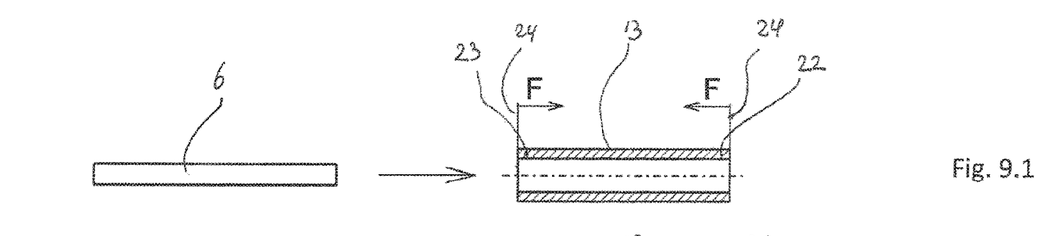

In FIG. 9.1 a first sleeve 13 is taken in a gripper tool 24, whereby the tool applies a caulking force F to the sleeve 13 in the vicinity of its longitudinal ends with forces directed towards each other such that the diameter of the sleeve 13 is increased. After the diameter of sleeve 13 is increased the winding shaft 6 can easily be assembled into the opening of the sleeve 13, 13'.

Figure 92:
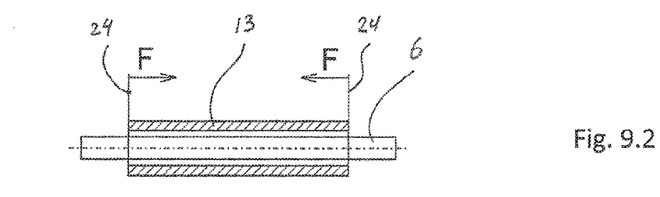

In FIG. 9.2 the shaft is positioned longitudinally such with regard to the sleeve 13 that an equal part at both ends of the shaft is uncovered.

Figure 93:
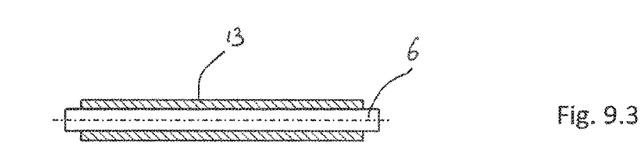

In the next process step shown in FIG. 9.3, the gripper tool 24 is removed and by the removal of the caulking force the sleeve 13 decreases in diameter and tightly fits around the shaft.

Figure 94:
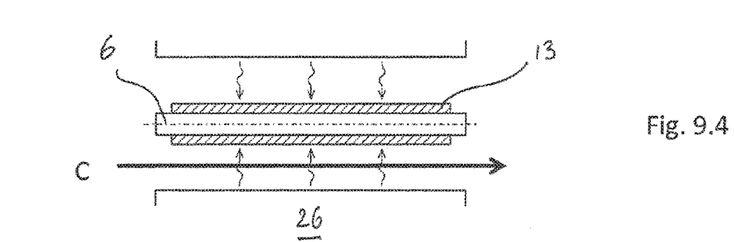

In a following process step shown in FIG. 9.4 the shaft with the sleeve 13 is subjected to heat of at least 140° C. This can be done by placing the shaft and assembled sleeve 13 onto a conveyer belt (schematically indicated with C in FIG. 9.4) which moves through an oven 26 producing heat with a temperature of at least 140° C. but not exceeding 200° C.

In a next process step (not shown) the shaft and the connected sleeve 13 are cooled off to cure the connection between the sleeve 13 and the shaft at connection points 21 at room temperature until the connection point is hardened and the connection is established.

Figure 95:
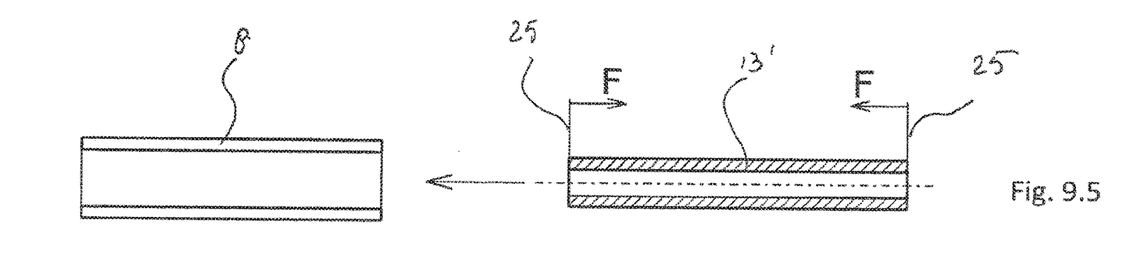
Figure 96:
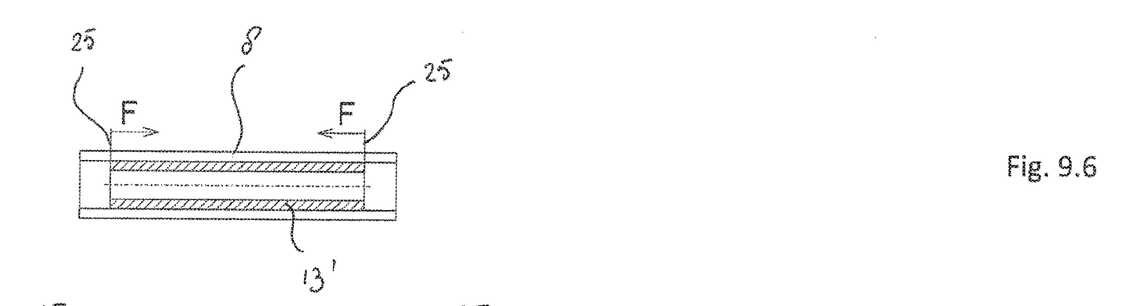
Figure 97:
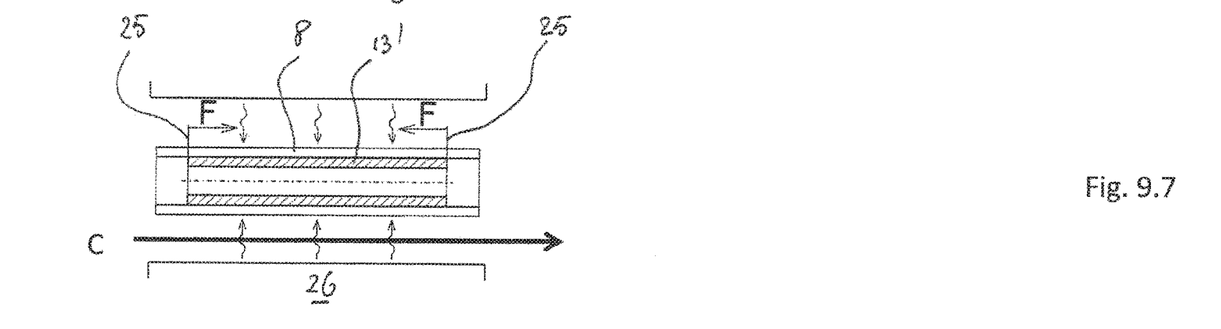
Figure 98:
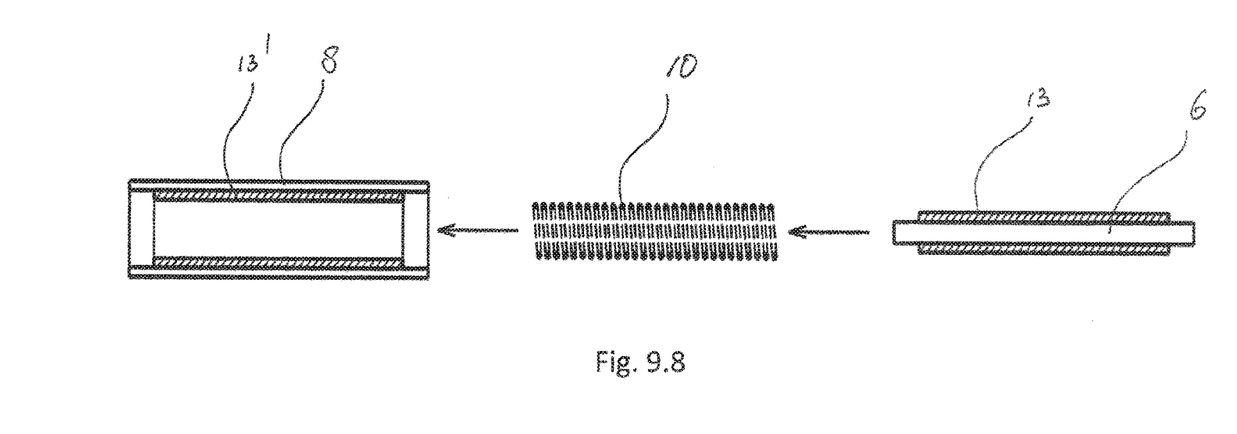
Figure 99:
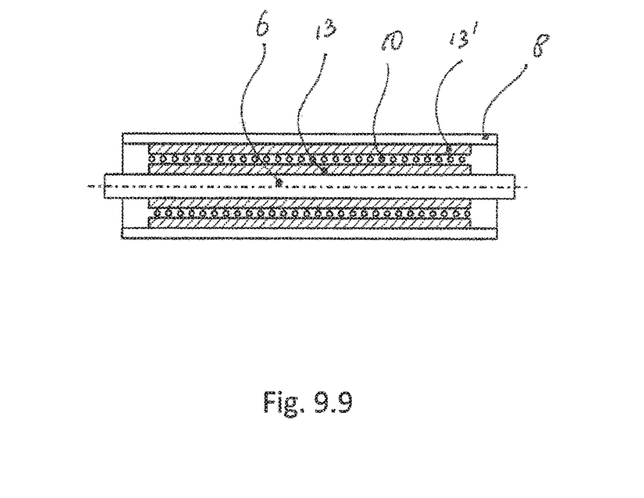

In FIGS. 9.5-9.7 the winding tube 8 and sleeve 13' are assembled together whereby the sleeve 13' is mounted into the hollow inside of the tube.

In a next process step as shown in FIG. 9.5 a second gripper tool 25 is applied to the second sleeve 13' in the vicinity of its longitudinal ends, applying a caulking force with forces directed towards each other, increasing the diameter of the sleeve 13' only then when the gripper tool 25 and sleeve 13' have been inserted into the winding tube 8. The caulking force applied by the gripper tool 25 is increased to such point that the outer surface 15 of the sleeve 13' engages the inner surface 11 of the tube as shown in FIG. 9.6.

In the next process step shown in FIG. 9.7 the assembly of the tube and sleeve 13' and the gripper tool 25 is subjected to heat of at least 140° C. This process step can be done also with use of an conveyor belt (schematically indicated with C) through an oven 26. In a next process step (not shown) the connection between the sleeve 13' and the inner surface of the tube is cured by cooling the assembly to room temperature until the connection points 21 are hardened and the permanent connection has been established. The caulking force F can then be released.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims. For example, it is conceivable that the at least one sleeve is not attached to the winding tube or winding shaft along its complete outer or inner surface, but only along selected areas if this would not interfere with the operation of the spring member. For example there might be interruptions in the attachment in longitudinal and/or circumferential direction of the sleeve. Instead of hot melt, it is possible to use other attachment means such as quickly curing glue or the like. The or each sleeve will generally cover the spring member substantially completely, in any condition thereof (biased and non-biased) but deviations from this principle are possible if the structure of the spring member allows.

What is claimed is:

1. A winding mechanism for a sunscreen, for use in an open roof construction for a vehicle, comprising
    a winding shaft which is supported at each longitudinal end to a stationary part of the open roof construction, and forming a central axis for rotation and
    a winding tube for winding and unwinding the sunscreen, being rotatable around the central axis,
    at least one spring member is configured to bias the winding tube in a direction for winding the sunscreen thereon, said spring member being arranged adjacent to an inner surface of the winding tube and an outer surface of the winding shaft,
    at least one sleeve is configured to engage the spring member and inhibit noise from the spring member, wherein the at least one sleeve comprises an inner surface and an outer surface,
    wherein the at least one sleeve is connected along its inner surface to the winding shaft or along its outer surface to the winding tube,
    wherein the at least one sleeve has a permanent connection to the winding shaft or the winding tube such that the at least one sleeve, which is flexible, will not shift in any lateral or radial direction relative to said spring member under influence of engagement forces of the spring member,
    wherein the at least one sleeve has a cylindrical shave and is circularly knitted or braided in a cylindrical manner.

2. The winding mechanism of claim 1, wherein the at least one sleeve is circularly knitted or braided from yarns from a material class comprising Polyolefin, Polyester or Polyamide, and be able to withstand temperatures up to at least 200° C.

3. The winding mechanism of claim 2, wherein the at least one sleeve comprises additional yarns of a material that melts at temperatures in a range of 140-200° C.

4. The winding mechanism of claim 2, wherein the at least one sleeve comprises additional yarns or intermingled fibers of a material having an additional noise inhibiting effect.

5. The winding mechanism of claim 2, wherein the at least one sleeve comprises additional yarns coated or soaked with a hot melt or wherein the inner or outer surface of the sleeve is integrally coated with hot melt.

6. The winding mechanism of claim 3, wherein the additional yarns are circularly knitted or braided in such a way that said yarns are exposed to the inner and outer surface of the at least one sleeve.

7. The winding mechanism of claim 1, wherein the at least one sleeve is connected on many individual points along the surface by melted sleeve material to the winding shaft or the winding tube under an influence of heat.

8. The winding mechanism of claim 1, further comprising a sunscreen with an end secured to the winding tube, the sunscreen being configured to be wound upon and unwound from the winding tube.

9. The winding mechanism of claim 1, comprising two sleeves, one being mounted between the spring member and the winding shaft and being connected with its inner surface to an outer surface of the winding shaft and the other being mounted between the spring member and the winding tube and being connected with its outer surface to the inner surface of the winding tube.

10. A winding mechanism for a sunscreen, for use in an open roof construction for a vehicle, comprising
   a winding shaft which is supported at each longitudinal end to a stationary part of the open roof construction, and forming a central axis for rotation and
   a winding tube for winding and unwinding the sunscreen, being rotatable around the central axis,
   at least one spring member is configured to bias the winding tube in a direction for winding the sunscreen thereon, said spring member being arranged adjacent to an inner surface of the winding tube and an outer surface of the winding shaft,
   at least one sleeve is configured to engage the spring member and inhibit noise from the spring member, wherein the at least one sleeve comprises an inner surface and an outer surface,
   wherein the at least one sleeve is connected along its inner surface to the winding shaft or along its outer surface to the winding tube,
   wherein the at least one sleeve is circularly knitted or braided from yarns from a material class comprising Polyolefin, Polyester or Polyamide, and be able to withstand temperatures up to at least 200° C.

11. The winding mechanism of claim 10, wherein the at least one sleeve has a permanent connection to the winding shaft or the winding tube such that the at least one sleeve, which is flexible, will not shift in any lateral or radial direction relative to said spring member under influence of engagement forces of the spring member.

12. The winding mechanism of claim 10, wherein the at least one sleeve has a cylindrical shape and is circularly knitted or braided in a cylindrical manner.

13. The winding mechanism of claim 10, wherein the at least one sleeve comprises additional yarns of a material that melts at temperatures in a range of 140-200° C.

14. The winding mechanism of claim 10, wherein the at least one sleeve comprises additional yarns or intermingled fibers of a material having an additional noise inhibiting effect.

15. The winding mechanism of claim 10, wherein the at least one sleeve comprises additional yarns coated or soaked with a hot melt or wherein the inner or outer surface of the sleeve is integrally coated with hot melt.

16. The winding mechanism of claim 13, wherein the additional yarns are circularly knitted or braided in such a way that said yarns are exposed to the inner and outer surface of the at least one sleeve.

17. The winding mechanism of claim 10, wherein the at least one sleeve is connected on many individual points along the surface by melted sleeve material to the winding shaft or the winding tube under an influence of heat.

18. The winding mechanism of claim 10, further comprising a sunscreen with an end secured to the winding tube, the sunscreen being configured to be wound upon and unwound from the winding tube.

19. The winding mechanism of claim 10, comprising two sleeves, one being mounted between the spring member and the winding shaft and being connected with its inner surface to an outer surface of the winding shaft and the other being mounted between the spring member and the winding tube and being connected with its outer surface to the inner surface of the winding tube.

* * * * *